US006745021B1

United States Patent

(12) Stevens

(10) Patent No.: US 6,745,021 B1
(45) Date of Patent: Jun. 1, 2004

(54) SYSTEM, CONTROLLER AND METHOD FOR ALERTING MOBILE SUBSCRIBERS ABOUT EMERGENCY SITUATIONS

(75) Inventor: Gilman R. Stevens, Fairview, TX (US)

(73) Assignee: Alcatel, Paris (FR)

( * ) Notice: Subject to any disclaimer, the term of this patent is extended or adjusted under 35 U.S.C. 154(b) by 551 days.

(21) Appl. No.: 09/717,731

(22) Filed: Nov. 21, 2000

(51) Int. Cl.[7] .............................................. H04M 11/04

(52) U.S. Cl. ............................... 455/404.1; 455/404.2; 455/414.1; 455/414.3; 455/432.1; 455/432.3

(58) Field of Search .......................... 455/404.1, 404.2, 455/411, 414, 432, 422.1, 458, 466, 414.1, 414.2, 414.3, 432.1, 432.3

(56) References Cited

U.S. PATENT DOCUMENTS 3,701,024 A * 10/1972 Knowles et al. ............ 455/526
4,153,881 A * 5/1979 Permut et al. .............. 375/242
4,155,042 A * 5/1979 Permut et al. ............... 340/7.5
5,121,430 A * 6/1992 Ganzer et al. .............. 380/258
5,278,539 A * 1/1994 Lauterbach et al. ........ 340/539
5,388,147 A * 2/1995 Grimes ....................... 455/404
5,444,433 A * 8/1995 Gropper ..................... 340/601
5,628,050 A * 5/1997 McGraw et al. ........... 455/12.1
5,781,852 A * 7/1998 Gropper ..................... 455/227
5,995,553 A * 11/1999 Crandall et al. ............ 375/272
6,112,074 A * 8/2000 Pinder ........................ 455/404
6,112,075 A * 8/2000 Weiser ....................... 455/404
6,201,856 B1 * 3/2001 Orwick et al. ................ 379/40
6,278,375 B1 * 8/2001 Hucker ....................... 340/601
6,343,213 B1 * 1/2002 Steer et al. ................. 455/411

OTHER PUBLICATIONS

SCC Innovation Saving Lives "Emergency Warning & Evacuation (EWE)", 2 pages from http://www.scc911.com/solutions/ewe.html (downloaded: Sep. 20, 2000).

SCC Innovation Saving Lives "Solutions—Government" 2 pages from http://www.scc911.com/solutions/gov.html (downloaded: Sep. 25, 2000).

* cited by examiner

*Primary Examiner*—William Trost
*Assistant Examiner*—Stephen D'Agosta
(74) *Attorney, Agent, or Firm*—William J. Tucker; Craig A. Hoersten; V. Lawrence Sewell

(57) ABSTRACT

A system, controller and method are described that can effectively alert a mobile subscriber about an emergency situation including, for example, a weather alert, a hostage situation or a hazardous material leak. In particular, the system includes an emergency warning system capable of generating information identifying a geographic area in which there is an emergency situation. The system also includes a controller capable of receiving the information identifying the troubled geographic area and is further capable of requesting and receiving from a wireless communications network a list of the mobile subscribers currently located within the troubled geographic area. Thereafter, the controller is capable of initiating an emergency notification message that is sent to at least one of the mobile subscribers. The emergency notification message can be in the form of a page, a voice message or a short text message.

24 Claims, 4 Drawing Sheets

SYSTEM, CONTROLLER AND METHOD FOR ALERTING MOBILE SUBSCRIBERS ABOUT EMERGENCY SITUATIONS

BACKGROUND OF THE INVENTION

1. Field of the Invention

The present invention relates in general to the telecommunications field and, in particular, to a system, controller and method capable of alerting a user of a mobile phone that an emergency situation such as a weather alert has been issued for a geographical area currently occupied by that user.

2. Background of the Invention

When it comes to public safety and personal safety, it is always desirable to improve upon the way people are warned about emergency situations including, for example, weather alerts, hostage situations and hazardous material leaks. To date there does not appear to be any system that can effectively warn a person when such an emergency situation occurs in a geographical area currently occupied by that person. For instance, people traditionally have had to watch the local channels on a television or listen to a radio to stay informed about threatening or severe weather conditions in their neighborhood. However, it is not practical to expect that people always watch the television or listen to the radio and as such people run the risk of being surprised by severe weather conditions. Moreover, since local television stations cover local weather conditions, it is possible that a person watching a national cable channel may not be informed about the threatening or severe weather conditions in their neighborhood.

Aural alarms such as sirens are also ineffective warning systems because people often cannot hear them while they are inside a building or while they are watching television, listening to music or sleeping. Moreover, the aural alarms may have different types of sirens to indicate different types of emergencies which can be very confusing in a dangerous way to people. For instance, imagine a family that is awakened in the middle of the night by a siren and wrongly assumes that the siren indicates there is a tornado warning and then seeks shelter in the basement when the siren is really indicating a flash flood warning. Accordingly, there is an existing need for a system, controller and method that can effectively alert people about emergency situations. This need and other needs are satisfied by the system, controller and method of the present invention.

BRIEF DESCRIPTION OF THE INVENTION

The present invention includes a system, controller and method all of which overcome the aforementioned shortcomings in the state-of-art by effectively alerting a mobile subscriber about an emergency situation including, for example, a weather alert, a hostage situation or a hazardous material leak. In particular, the system includes an emergency warning system capable of generating information identifying a geographic area in which there is an emergency situation. The system also includes a controller capable of receiving the information identifying the troubled geographic area and is further capable of requesting and receiving from a wireless communications network a list of the mobile subscribers currently located within the troubled geographic area. Thereafter, the controller is capable of initiating an emergency notification message that is sent to at least one of the mobile subscribers. The emergency notification message can be in the form of a page, a voice message (first embodiment) or a short text message (second embodiment).

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1–4, there are disclosed a system 100, a controller 104 and a preferred method 400 all of which are capable of effectively alerting mobile subscribers about emergency situations including, for example, weather alerts, hostage situations or hazardous material leaks.

Figure 1:
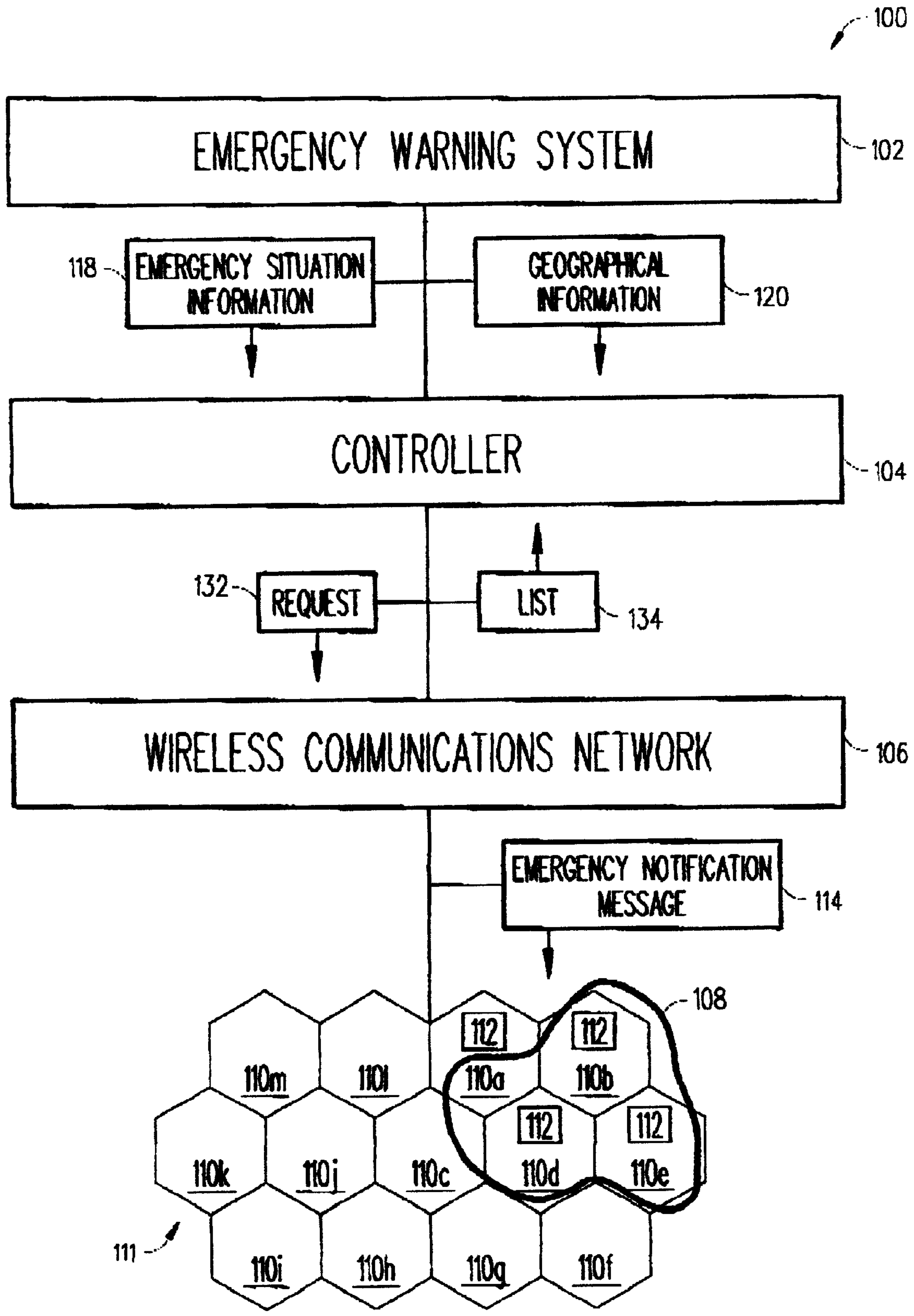
FIG. 1 is a block diagram illustrating the basic components of a system in accordance with the present invention.

Referring to FIG. 1, there is a block diagram illustrating the basic components of the system 100. Basically, the system 100 includes an emergency warning system 102, a controller 104 and a wireless communications network 106. The emergency warning system 102 generates information describing an emergency situation and information identifying a geographic area 108 that is or can be affected by the emergency situation.

The controller 104 receives the emergency situation information 118 and the geographical information 120 and then determines which of the cells 110*a*–110*m* in the coverage area 111 of the wireless communications network 106 encompass the troubled geographical area 108. As illustrated, the wireless communications network 106 has cells 110*a*–110*e* that encompass the troubled geographical area 108. Alternatively, the controller 104 can determine which of the location areas or any other identifying areas in the coverage area 111 of the wireless communications network 106 that happen to be associated in one way or the other with the troubled geographical area 108.

The controller 104 then sends a request 132 to the wireless communications network 106 and receives therefrom a list 134 of the mobile subscribers 112 (only four shown) that are currently located in cells 110*a*–110*e* associated with the troubled geographic area 108. Thereafter, the controller 104 initiates an emergency notification message 114 that is sent to one or more of the mobile subscribers 112. The emergency notification message 114 alerts the mobile subscribers 112 about the emergency situation. In addition, the emergency notification message 114 may also provide the mobile subscribers 112 with safety related instructions the content of which is dependent on the particular type of emergency situation.

Figure 2:
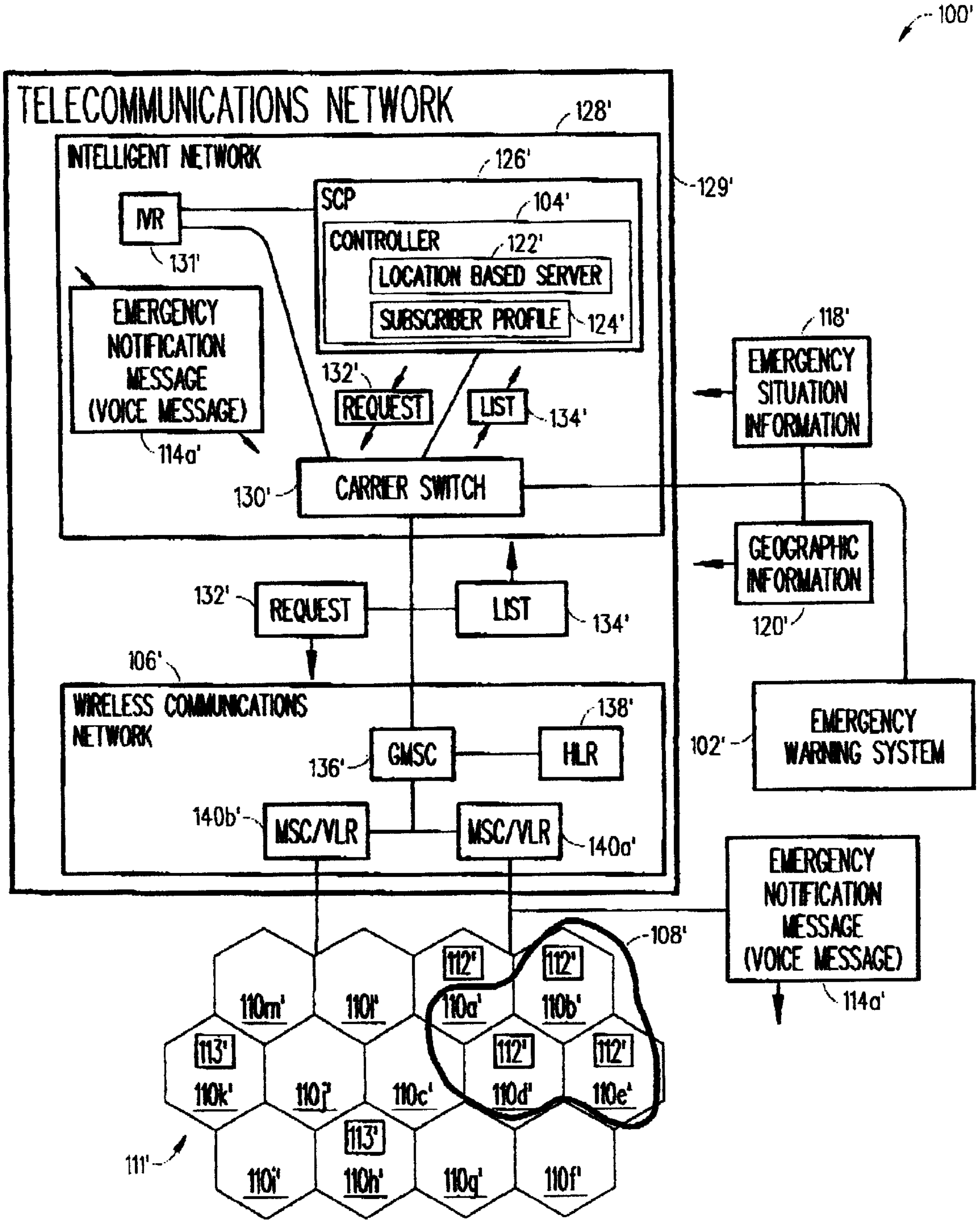
FIG. 2 is a block diagram illustrating a first embodiment of the system shown in FIG. 1.

Referring to FIG. 2 there is a block diagram illustrating in greater detail a first embodiment of the system 100 shown using prime referenced numerals. In the first embodiment, the system 100' includes an emergency warning system 102', a controller 104' and a wireless communications network 106'. The emergency warning system 102' generates information describing the emergency situation and information identifying the geographic area 108' that is or can be affected by the emergency situation.

The emergency situation information 118' includes details about the emergency situation and possibly includes safety related instructions the content of which is dependent on the particular type of emergency situation. Again, the current emergency situation can be one of a variety of potentially dangerous situations including, for example, a severe weather condition, hostage situation or hazardous material leaks. The severe weather conditions can include a watch or warning issued for a hurricane, flash flood, tornado, winter storm or thunderstorm. Whereas, the geographic information 120' includes details that describe the geographic area 108' associated with the current or potential emergency situation. These details can be the coordinates or grids on a map which outline the geographical area 108'. Or, the details that describe the geographic area 108' can be a list of the counties, townships or cities threatened by the emergency situation.

The controller 104' includes a location based server 122' and a subscriber profile 124'. In this example, the controller 104' is incorporated within a service control point (SCP) 126' of an intelligent network 128' which also includes a carrier switch 130' (or service switching point (SSP)) and an interactive voice response system (IVR) 131'. The intelligent network 128' and the wireless communications network 106' can be part of an overall telecommunications network 129'.

In operation, the emergency warning system 102' forwards the emergency situation information 118' and the geographical information 120' to the carrier switch 130'. The carrier switch 130' then forwards the emergency situation information 118' and the geographical information 120' to the location based server 122'. Thereafter, the location based server 122' determines which of the cells 110*a*'–110*m*' in the coverage area 111' of the wireless communications network 106' encompass the troubled geographical area 108'. As illustrated, the wireless communications network 106' has cells 110*a*'–110*e*' that encompass the troubled geographical area 108'. Alternatively, the location based server 122' can determine which of the location areas or any other identifying areas in the coverage area 111' of the wireless communications network 106' that happen to be associated in one way or the other with the troubled geographical area 108'.

The controller 104' then sends a request 132' to the wireless communications network 106' and receives therefrom a list 134' of the mobile subscribers 112' (only four shown) currently located in cells 110*a*'–110*e*' which are associated in one way or the other with the troubled geographic area 108'. To accomplish this, the land based server 122' sends the request 132' containing the information identifying the cells 110*a*'–110*e*' associated with the troubled geographical area 108' to a gateway mobile switching center (GMSC) 136' through the carrier switch 130'. The GMSC 136' determines which mobile subscribers 112' are currently located in cells 110*a*'–110*e*' by sending a query to a home location register (HLR) 138'.

The HLR 138' is a database that can provide the address or phone number of each mobile subscriber 112' currently located in cells 110*a*'–110*e*' managed by a mobile switching center/visitor location register (MSC/VLR) 140*a*'. Basically, the HLR 138' is able to keep track of which mobile subscribers 112' and 113' (only six shown) are currently located in cells 110*a*'–110*m*' because all mobile subscribers 112' and 113' are required to register with the appropriate MSC/VLRs 140*a*'–140*b*' when they power-on or enter the area managed by a particular MSC/VLR 140*a*' or 140*b*'. As illustrated, MSC/VLR 140*b*' manages cells 110*f*'–110*m*'. For instance, if any mobile subscriber 112' roams into one of the cells 110*a*'–110*e*' managed by MSC/VLR 140*a*' then that VLR requests subscriber information about this mobile subscriber 112' from the HLR 138'. At the same time, the HLR 138' provides the subscriber information to the MSC/VLR 140*a*' it also updates its own records. As such, the HLR 138' is able to keep track of the current locations of each mobile subscriber 112' and 113'.

In response to the request 132', the GMSC 136' is able to obtain the list 134' indicating which mobile subscribers 112' are currently located in the troubled geographical area 108'. The GMSC 136' then forwards the list 134' through the carrier switch 130' to the location based server 122'. Upon receiving the list 134', the location based server 122' can direct the IVR 131' to forward a pre-recorded voice message 114*a*' to the mobile subscribers 112' currently located in the troubled geographic area 108'. The pre-recorded voice message 114*a*' is the emergency notification message 114' which informs the mobile subscribers 112' of the emergency situation.

Alternatively, the location based server 122' can interact with the subscriber profile 124' to determine if any of the mobile subscribers 112' on the list 134' have special instructions on how, if at all, they are to be alerted. For instance, one of the mobile subscribers 112' may have instructions in the subscriber profile 124' that indicates they only want to receive the emergency notification message 114*a*' if there is a tornado warning in their geographical area and not receive the emergency notification message 114*a*' if there is a tornado watch or severe thunderstorm warning. In addition, a mobile subscriber 112' can have directions in the subscriber profile 124' that tells the controller 104' to try and send the emergency notification message 114' to their land based phone if they do not answer their mobile phone. In other words, the subscriber profile 124' can contain instructions which direct the controller 104' on how to send the emergency notification message 114*a*' to each of the mobile subscribers 112'.

It should be understood that the controller 104' may even send an emergency notification message 114*a*' to a mobile subscriber 113' that is currently roaming in another cell 110*k*' but has their home subscription with MSC/VLR 140*a*'. In this way, the traveling mobile subscriber 113' may be informed of an emergency situation at their home or work place.

It should also be understood that the present invention can still work properly if the troubled geographic area 108' happened to encompass cells 110*j*'–110*m*' managed by MSC/VLR 140*b*' and cells 110*a*'–110*c*' managed by MSC/VLR 140*a*'. In this case, mobile subscribers 112' and 113' located in cells 110*a*', 110*b*' and 110*k*' would receive the emergency notification message 114*a*'.

Figure 3:
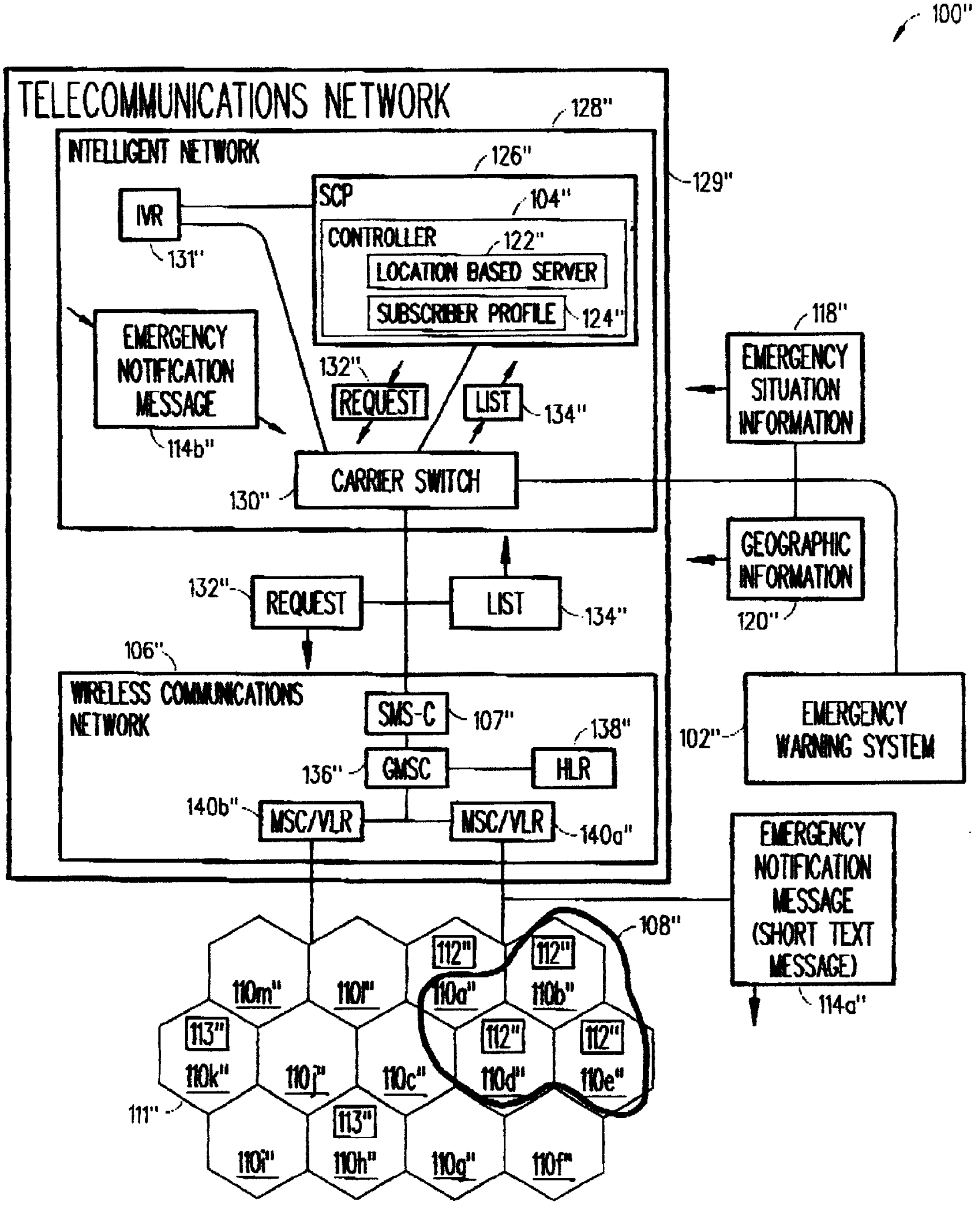
FIG. 3 is a block diagram illustrating a second embodiment of the system shown in FIG. 1.

Referring to FIG. 3 there is a block diagram illustrating in greater detail a second embodiment of the system 100 shown using doubled prime referenced numerals. The system 100" is similar to the first embodiment except that the wireless communications network 106" includes a short message service center (SMS-C) 107". The short messaging service is supported by the Global System for Mobile Communications (GSM) standard.

In the second embodiment, the system 100" includes an emergency warning system 102", a controller 104" and a wireless communications network 106". The emergency warning system 102" generates information describing the emergency situation and information identifying the geographic area 108" that is or can be affected by the emergency situation. The emergency situation information 118" includes details about the emergency and possibly includes safety related instructions the content of which is dependent on the particular type of emergency situation. Again, the current emergency situation can be one of a variety of potentially dangerous situations including, for example, a severe weather condition, hostage situation or hazardous material leak. The severe weather conditions can include a watch or warning issued for a hurricane, flash flood, tornado, winter storm or thunderstorm. Whereas, the geographic information 120" includes details that describe the geographic area 108" associated with the current or potential emergency situation. These details can be the coordinates or grids on a map which outline the geographical area 108". Or, the details that describe the geographic area 108" can be a list of the counties, townships or cities threatened by the emergency situation.

The controller 104" includes a location based server 122" and a subscriber profile 124". In this example, the controller 104" is incorporated within a service control point (SCP) 126" of an intelligent network 128" which also includes a carrier switch 130" (or service switching point (SSP)) and an interactive voice response system (IVR) 131". The intelligent network 128" and the wireless communications network 106" can be part of an overall telecommunications network 129".

Like the first embodiment, the emergency warning system 102" forwards the emergency situation information 118" and the geographical information 120" to the carrier switch 130". The carrier switch 130" then forwards the emergency situation information 118" and the geographical information 120" to the location based server 122". Thereafter, the location based server 122" determines which of the cells 110*a*"–110*m*" in the coverage area 111" of the wireless communications network 106" encompass the troubled geographical area 108". As illustrated, the wireless communications network 106" has cells 110*a*"110*e*" that encompass the troubled geographical area 108". Alternatively, the location based server 122" can determine which of the location areas or any other identifying areas in the coverage area 111" of the wireless communications network 106" that happen to be associated in one way or the other with the troubled geographical area 108".

The controller 104" then sends a request 132" to the wireless communications network 106" and receives therefrom a list 134" of the mobile subscribers 112" (only four shown) currently located in cells 110*a*"–110*e*" which are associated in one way or the other with the troubled geographic area 108". To accomplish this, the land based server 122" sends the request 132" containing the information identifying the cells 110*a*"110*e*" associated with the troubled geographical area 108" to a gateway mobile switching center (GMSC) 136" through the carrier switch 130" and SMS-C 107". The GMSC 136" determines which mobile subscribers 112" are currently located in cells 110*a*'–110*e*' by sending a query to a home location register (HLR) 138'.

The HLR 138" is a database that can provide the address or phone number of each mobile subscriber 112" currently located in cells 110*a*"–110*e*" managed by a mobile switching center/visitor location register (MSC/VLR) 140*a*". Basically, the HLR 138" is able to keep track of which mobile subscribers 112" and 113" (only six shown) are currently located in cells 110*a*"–110*m*" because all mobile subscribers 112" and 113" are required to register with the appropriate MSC/VLRs 140*a*"–140*b*" when they power-on or enter the area managed by a particular MSC/VLR 140*a*" or 140*b*". As illustrated, MSC/VLR 140*b*" manages cells 110*f*"–110*m*". For instance, if any mobile subscriber 112" roams into one of the cells 110*a*"–110*e*" managed by MSC/VLR 140*a*" then that VLR requests subscriber information about this mobile subscriber 112" from the HLR 138". At the same time, the HLR 138" provides the subscriber information to the MSC/VLR 140*a*" it also updates its own records. As such, the HLR 138" is able to keep track of the current locations of each mobile subscriber 112" and 113".

In response to the request 132", the GMSC 136" is able to obtain the list 134" indicating which mobile subscribers 112" are currently located in the troubled geographical area 108". The GMSC 136" then forwards the list 134" through the SMS-C 107" and the carrier switch 130" to the location based server 122". Upon receiving the list 134", the location based server 122" can automatically request that the IVR 131" interact with and direct the SMS-C 107" to send a short text message 114*b*" to the mobile subscribers 112". The short text message 114*b*" is the emergency notification message 114 which can have as many as 160 alphanumeric characters to inform the mobile subscribers 112" of the emergency situation.

Alternatively, the location based server 122" can interact with the subscriber profile 124" to determine if any of the mobile subscribers 112" on the list 134" have special instructions on how, if at all, they are to be alerted. For instance, one of the mobile subscribers 112" may have instructions in the subscriber profile 124" that indicates they only want to receive the emergency notification message 114*b*" if there is a tornado warning in their geographical area and not receive the emergency notification message 114*b*" if there is a tornado watch or severe thunderstorm warning. In addition, a mobile subscriber 112" can have directions in the subscriber profile 124" that tells the controller 104" to try and send the emergency notification message 114*b*" to their land based phone if they do not answer their mobile phone. In other words, the subscriber profile 124" can contain instructions which direct the controller 104" on how to send the emergency notification message 114*b*" to each of the mobile subscribers 112".

Like the first embodiment, the controller 104" may even send an emergency notification message 114*b*" to a mobile subscriber 113" that is currently roaming in another cell 112k" but has their home subscription with MSC/VLR 140*a*". In this way, the traveling mobile subscriber 113" may be informed of an emergency situation at their home or work place.

It should be understood that the present invention can still work properly if the troubled geographic area 108" happened to encompass cells 110*j*"–110*m*" managed by MSC/VLR 140*b*" and cells 110*a*"–110c" managed by MSC/VLR 140*a*". In this case, mobile subscribers 112" and 113" located in cells 110*a*", 110*b*" and 110*k*" would receive the emergency notification message 114*b*".

Figure 4:
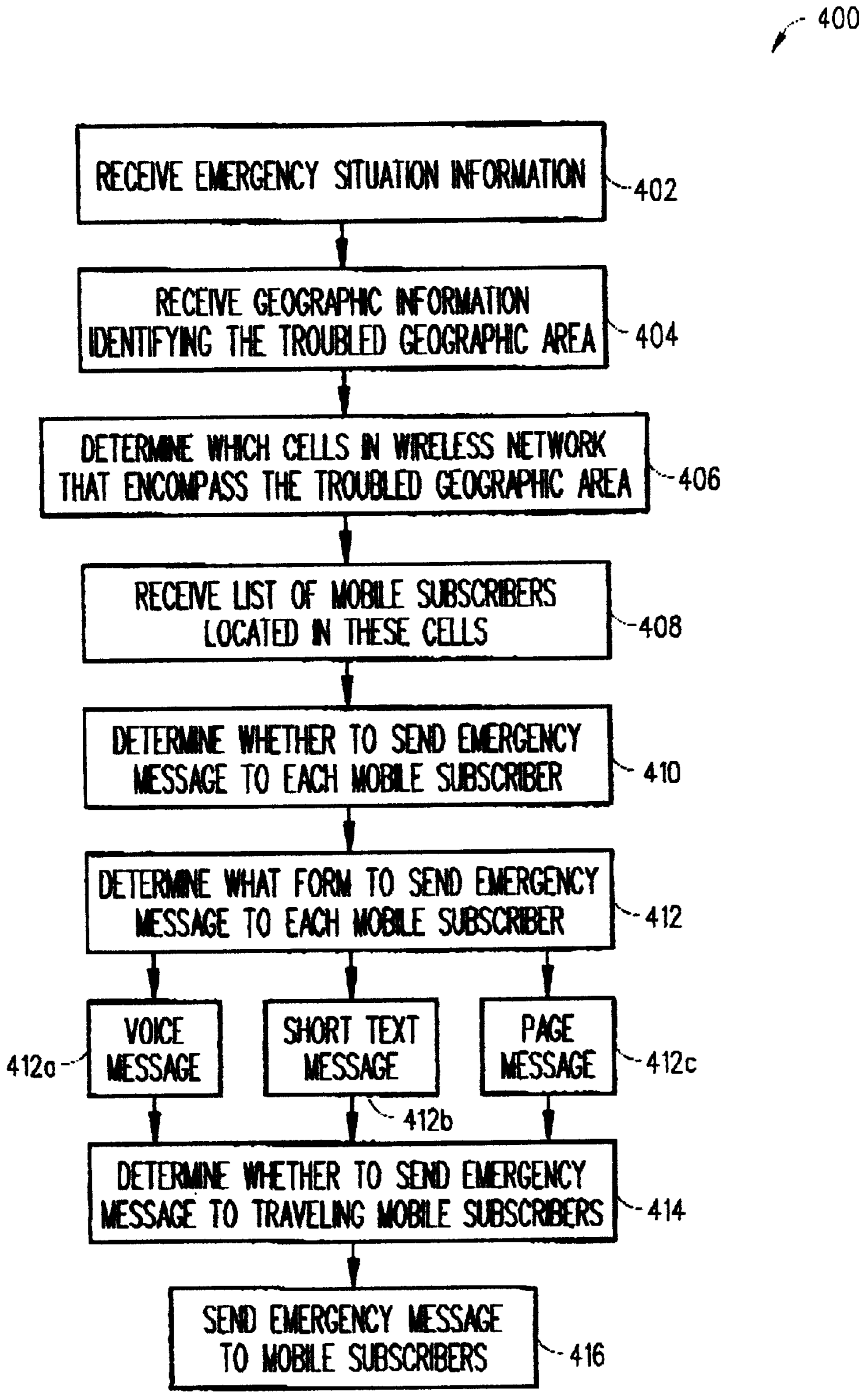
FIG. 4 is a flowchart illustrating the steps of a preferred method in accordance with the present invention.

Referring to FIG. 4, there is a flowchart illustrating the steps of the preferred method 400 in accordance with the present invention. Basically, the preferred method 400 enables a controller 100 to send a voice message 114*a*' or the short text message 114*b*' to one or more mobile subscribers 112 alerting them about an emergency situation such as a weather alert that has been issued for a geographical area 108. The troubled geographic area 108 may be occupied by mobile subscribers 112 or of special interest to a traveling mobile subscriber 113. Beginning at step 402, the controller 100 receives information about the emergency situation from the emergency warning system 102. As mentioned earlier, the emergency situation information 118 includes details about the emergency situation and possibly includes safety related instructions the content of which depends on the particular type of emergency situation. The current emergency situation can be one of a variety of potentially dangerous situations including, for example, a severe weather condition, hostage situation or hazardous material leak. The emergency warning system 102 may be associated with an organization that has access to weather information including, for example, the national weather service, the Weather Channel or local television stations.

At step 404, the controller 104 also receives information about the geographic area 108 in which there is an emergency situation. The geographic information 120 can include details that describe the geographic area 108 such as the coordinates or grids on a map which outline the geographical area 108. Or, the details that describe the geographic area 108 can simply be a list of the counties, townships or cities threatened by the emergency situation.

At step 406, the controller 104 determines which cells 110*a*–110*m*' in the coverage area 111 of the wireless communications network 106 happen to encompass the troubled geographical area 108. As illustrated in FIG. 1, the wireless communications network 106 has cells 110*a*–110*e* that are associated with the troubled geographical area 108. Alternatively, the controller 104 can determine which of the location areas or any other identifying areas in the coverage area 111 of the wireless communications network 106 happen to be associated in one way or the other with the troubled geographical area 108.

At step 408, the controller 104 then interacts with the wireless communications network 106 and receives a list 134 of the mobile subscribers 112 currently located in cells 110*a*–110*e* which are associated with the troubled geographic area 108. A description about one way that this can be accomplished has been provided above with respect to FIGS. 2–3.

At step 410, the controller 104 using the subscriber profile 122 determines whether or not to send the emergency notification message 114 to anyone of the mobile subscribers 112. For instance, one of the mobile subscribers 112 may have instructions in the subscriber profile 124 that indicates they only want to receive the emergency notification message 114 if there is a tornado warning in their geographical area and not receive the emergency notification message 114 if there is a tornado watch or severe thunderstorm warning in their geographical area.

At step 412, the controller 104 using the subscriber profile 124 determines in what form the emergency notification message 114 is to be sent to each mobile subscriber 112. For instance, each mobile subscriber 112 can select the form they want to receive their emergency notification message 114 which can be either a voice recorded message 114*a*' (step 412*a*), a short text message 114*b*" (step 412*b*) or a page (step 412*c*).

At step 414, the controller 104 using the subscriber profile 124 also determines whether or not to send the emergency notification message 114 to a mobile subscriber 113 that is currently roaming in another cell 112*k* besides cells 110*a*–110*e* but has their home subscription with MSC/VLR 140*a*' which has been associated with the troubled geographic area 108. In this way, the traveling mobile subscriber 113 may be informed of an emergency situation at or near their home or work place.

At step 416, the controller 104 may direct the IVR 131 or the SMS-C 107" to send the emergency notification message 114*a*' or 114*b*" to mobile subscribers 112 and 113. It should be understood that steps 410, 412 and 414 can be bypassed which enables the emergency notification message 114 to be sent directly to mobile subscribers 112 regardless of the subscriber profile 122 (if any).

Certain details associated with the wireless communications network 106 are known in the industry and as such need not be described herein. Therefore, for clarity, the description provided above in relation to the wireless communications network 106 omits some components not necessary to understand the present invention.

From the foregoing, it can be readily appreciated by those skilled in the art that the present invention provides a system, controller and method capable of alerting mobile subscribers about emergency situations. As disclosed, the present invention basically operates to alert a mobile subscriber about an emergency situation including, for example, a weather alert, a hostage situation or a hazardous material leak in or near their current location.

Although two embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A system comprising:

a wireless communications network;

an emergency warning system capable of generating information identifying a geographic area in which there is an emergency situation;

a controller capable of receiving the information identifying the geographic area and further capable of requesting and receiving a list of mobile subscribers located within the geographic area from said wireless communications network;

said controller further capable of interfacing with a subscriber profile to determine if any of the mobile subscribers have provided special instructions on how, if at all, they are to be alerted about the emergency situation;

said controller is also capable of initiating an emergency notification message that is sent to at least one of the mobile subscribers pursuant to the special instructions if any in the subscriber profile;

wherein at least one of the mobile subscribers can have special instructions in the subscriber profile that indicates they only want to receive the emergency notification message if there is one type of emergency situation and not receive the emergency notification message if there is another type of emergency situation; and wherein at least one of the mobile subscribers can have special instructions in the subscriber profile that indicates they want said controller to send the emergency notification message to their land based phone if they do not answer their mobile phone.

2. The system of claim 1, wherein said controller is capable of directing a short message service to send the emergency notification message towards the at least one of the mobile subscribers.

3. The system of claim 1, wherein said controller is capable of directing an interactive voice response system to send the emergency notification message towards the at least one of the mobile subscribers.

4. The system of claim 1, wherein said controller is capable of directing a paging service to send the emergency notification message towards the at least one of the mobile subscribers.

5. The system of claim 1, wherein said controller further includes a location based server capable of receiving the information identifying the geographic area and further capable of requesting and receiving the list of mobile subscribers located within the geographic area.

6. The system of claim 1, wherein at least one of the mobile subscribers can have special instructions in the subscriber profile that indicates they want said controller to send the emergency notification message to them even though they are not located within the geographic area experiencing the emergency situation.

7. The system of claim 1, wherein said emergency notification message includes information describing the emergency situation.

8. The system of claim 1, wherein said emergency situation includes a severe weather condition, a hostage situation or a hazardous material leak.

9. The system of claim 1, wherein said geographic information further includes geographical coordinates on a map.

10. The system of claim 1, wherein said controller is incorporated within a service control point.

11. A method for alerting a mobile subscriber about an emergency situation in a specific geographic area, said method comprising the steps of:

receiving information describing the emergency situation;

receiving information identifying the geographic area in which there is the emergency situation;

receiving a list identifying the mobile subscribers currently located within the geographic area experiencing the emergency situation;

interfacing with a subscriber profile to determine if any of the mobile subscribers have provided special instructions on how, if at all, they are to be alerted about the emergency situation;

sending an emergency notification message containing at least a portion of the information about the emergency situation to at least one of the mobile subscribers pursuant to the special instructions if any in the subscriber profile;

wherein at least one of the mobile subscribers can have special instructions in the subscriber profile that indicates they only want to receive the emergency notification message if there is one type of emergency situation and not receive the emergency notification message if there is another type of emergency situation; and wherein at least one of the mobile subscribers can have special instructions in the subscriber profile that indicates they want said controller to send the emergency notification message to their land based phone if they do not answer their mobile phone.

12. The method of claim 11, wherein at least one of the mobile subscribers can have special instructions in the subscriber profile that indicates they want said controller to send the emergency notification message to them even though they are not located within the geographic area experiencing the emergency situation.

13. The method of claim 11, wherein said emergency notification message is a short text message.

14. The method of claim 11, wherein said emergency notification message is a voice message.

15. The method of claim 11, wherein said emergency notification message is a page.

16. The method of claim 11, wherein said emergency notification message includes information describing what safety precautions should be taken in view of the particular type of emergency situation.

17. The method of claim 11, wherein said emergency situation includes a severe public safety condition.

18. A controller comprising:

a location based server capable of interacting with an emergency warning system to receive information about an emergency situation and to receive information about a geographic area experiencing the emergency situation;

said location based server is also capable of interacting with a wireless communications network to receive a list of mobile subscribers currently located within the geographic area experiencing the emergency situation;

a subscriber profile that contains special instructions from at least one of the mobile subscribers on how, if at all, they are to be alerted about the emergency situation; and said location based server is further capable of directing that an emergency notification message be sent to at least one of the mobile subscribers pursuant to the special instructions if any in the subscriber profile wherein at least one of the mobile subscribers can have special instructions in the subscriber profile that indicates they only want to receive the emergency notification message if there is one type of emergency situation and not receive the emergency notification message if there is another type of emergency situation; and wherein at least one of the mobile subscribers can have special instructions in the subscriber profile that indicates they want said controller to send the emergency notification message to their land based phone if they do not answer their mobile phone.

19. The controller of claim 18, wherein at least one of the mobile subscribers can have special instructions in the subscriber profile that indicates they want said controller to send the emergency notification message to them even though they are not located within the geographic area experiencing the emergency situation.

20. The controller of claim 18, wherein said emergency notification message is a short text message, a voice message or a page.

21. The controller of claim 18, wherein said emergency situation includes a severe weather condition and said emergency notification message includes information about the severe weather condition.

22. The controller of claim 18, wherein said emergency situation includes a hazardous material leak and said emergency notification message includes information about the hazardous material leak.

23. The controller of claim 18, wherein said emergency situation includes a hostage situation and said emergency notification message includes information about the hostage situation.

24. The controller of claim 18, wherein said controller is incorporated with a service control point in an intelligent network.

* * * * *